(12) United States Patent
Brown et al.

(10) Patent No.: US 7,721,315 B2
(45) Date of Patent: May 18, 2010

(54) METHOD AND SYSTEM FOR ON-DEMAND DELIVERY OF PERSONALIZED INTERNET-BASED CONTENT TO TELEVISION VIEWERS

(75) Inventors: Michael A. Brown, University City, MO (US); Edward D. Briscoe, Ladue, MO (US)

(73) Assignee: Vibe Solutions Group, Inc., St. Louis, MO (US)

( * ) Notice: Subject to any disclaimer, the term of this patent is extended or adjusted under 35 U.S.C. 154(b) by 1551 days.

(21) Appl. No.: 11/015,325

(22) Filed: Dec. 17, 2004

(65) Prior Publication Data

US 2006/0146788 A1    Jul. 6, 2006

(51) Int. Cl.
*H04N 7/173* (2006.01)

(52) U.S. Cl. .................... 725/109; 725/115; 725/116; 725/121

(58) Field of Classification Search .............. 725/109, 725/115–116, 121
See application file for complete search history.

(56) References Cited

U.S. PATENT DOCUMENTS

| | | | |
|---|---|---|---|
| 5,850,218 A | | 12/1998 | LaJoie et al. |
| 6,018,768 A | * | 1/2000 | Ullman et al. ............... 709/218 |
| 6,493,876 B1 | | 12/2002 | DeFreese et al. |
| 7,089,579 B1 | * | 8/2006 | Mao et al. .................... 725/109 |

OTHER PUBLICATIONS

Bickers, James; *How DVRs Work*; downloaded from http://electronics.howstuffworks.com/dvr.htm on Dec. 14, 2004.
Schiller, Jay; *Network PVR: Everything on Demand*; downloaded from http://www.ncube.com/pressroom/downloads/nvpr-whitepape.pdf around but not later than Dec. 10, 2004.
TechEncyclopedia, CMTS; downloaded from http://www.techweb.com/encyclopedia/defineterm.jhtml on Dec. 7, 2004.
TechEncyclopedia, cable Internet; downloaded from http://www.techweb.com/encyclopedia/defineterm.jhtml on Dec. 1, 2004.
TechEncyclopedia, Internet TV; downloaded from http://www.techweb.com/encyclopedia/defineterm.jhtml on Dec. 1, 2004.
TechEncyclopedia, MSN TV; downloaded from http://www.techweb.com/encyclopedia/defineterm.jhtml on Dec. 1, 2004.
TechEncyclopedia, cable modem; downloaded from http://www.techweb.com/encyclopedia/defineterm.jhtml on Dec. 1, 2004.
TechEncyclopedia, WorldGate; downloaded from http://www.techweb.com/encyclopedia/defineterm.jhtml on Dec. 1, 2004.

(Continued)

*Primary Examiner*—Hunter B. Lonsberry
(74) *Attorney, Agent, or Firm*—Thompson Coburn LLP; Benjamin L. Volk, Jr.

(57) ABSTRACT

A method of delivering personalized content to customers of a subscription television service for display on their televisions, the method comprising: (a) converting Internet-based content from an Internet based format to a format suitable for display on a customer's television through a customer's set top box, and (b) after the conversion, delivering the converted content to a set top box associated with that customer for display on that customer's television. With such a method, the customer's set top box need not be Internet-enabled. Preferably, the customer's subscription television service is a cable television service.

24 Claims, 9 Drawing Sheets

OTHER PUBLICATIONS searchNetworking.com Definitions, set-top box; downloaded from http://searchnetworking.techtarget.com/sDefinition/0,,sid7_gci212971,00.html on Dec. 1, 2004.

searchNetworking.com Definitions, cable head-end; downloaded from http://searchnetworking.techtarget.com/sDefinition/0,,sid7_gci549164,00.html on Dec. 1, 2004.

Whatis.com Target Search, interactive TV; downloaded from http://whatis.techtarget.com/definition/0,,sid9_gci212362,00.html on Dec. 1, 2004.

searchWebServices.com Definitions, WebTV; downloaded from http://searchwebservices.techtarget.com/sDefinition/0,,sid26_gci213354,00.html on Dec. 1, 2004.

Franklin, Curt; *How Cable Television Works*; downloaded from http://stuffo.howstuffworks.com/cable-tv.htm on Dec. 1, 2004.

Franklin, Curt; *How Cable Modems Work*; downloaded from http://computer.howstuffworks.com/cable-modem.htm on Dec. 1, 2004.

\* cited by examiner

Figure 1 – Content Delivery with Notification

Figure 2 – Content Delivery with Video Streamer and Notification

Figure 3 – Content Delivery w/o Notification

Figure 4 – Content Delivery with Video Streamer and w/o Notification

METHOD AND SYSTEM FOR ON-DEMAND DELIVERY OF PERSONALIZED INTERNET-BASED CONTENT TO TELEVISION VIEWERS

FIELD OF THE INVENTION

The present invention relates to delivery of personalized Internet-based content, preferably multimedia content such as video, to television viewers having a subscription television service such as a cable television service.

BACKGROUND AND SUMMARY OF THE INVENTION

With current cable television VoD technology known to the inventors herein, cable customers are typically limited to viewing video content that is predetermined by the cable provider and made generally available to all of that cable provider's VoD customers (or at least all of a particular class of that cable provider's VoD customers). With this technology, the VoD system typically presents the customer with a menu that lists the predetermined VoD content options (e.g., movies and television programming provided by the major television networks, cable stations, and pay per view (PPV) providers). From this list, the customer can select a particular item of predetermined VoD content for viewing on the customer's television through a set top box (STB).

Furthermore, digital personal video recorder (PVR) technology has recently reached the television viewing market and is expected to experience explosive future growth. With PVR technology, television viewers are provided with, among other things, (1) the ability to digitally record and store television programming for later playback, (2) the ability to flexibly define what television programming is to be recorded and stored for later playback, and (3) the ability to "pause" and "rewind" "live" television broadcasts. PVR technology typically comes in two modes, (1) a "client-side" PVR wherein an enhanced customer STB performs the recording and storage of programming locally, and (2) a "server-side" PVR wherein the recording and storage of programming is performed by hardware and software located in the cable company's head end.

To the best of the inventors' knowledge, customers who use conventional VoD systems, client-side PVR, or server-side PVR are still limited by the degree to which they can "personalize" the content to be played on their televisions through the cable company system. That is, with these systems, customers are limited to recording and storing only the predetermined content made available to them via the major TV networks, cable stations, and PPV providers.

Some cable company systems provide a degree of freedom in the content that their customers can view on their televisions via those cable company systems' respective broadband Internet services, which can be generally referred to as "cable Internet" systems. With conventional cable Internet systems, a cable modem termination system (CMTS) located in a cable head end functions to interface the cable company head end with the Internet. When providing Internet content to a cable customer, the CMTS (1) receives packets from the Internet having an Internet protocol (IP) payload, (2) encapsulates those packets in an MPEG header appropriate to the cable system, and (3) forwards the MPEG encapsulated packet of IP content to either a cable modem associated with that customer (to view the content on that customer's PC) or an enhanced STB associated with that customer (to view the content on that customer's television).

The cable modem is typically in communication with the customer's PC and operates to remove the MPEG headers from received packets so that the received packets can be processed using standard Internet applications such as web browsers and the like. The enhanced STB is configured with specialized hardware and/or software to reformat the IP content payloads of the received packets to a format suitable for display on the customer's television (e.g., MPEG2 or the like). Such an STB can be referred to as an "Internet-enabled STB". The Internet-enabled STBs used in cable Internet systems are also often configured with a variety of hardware and/or software applications related to VoD technology and the like, as shown in, for example, U.S. Pat. No. 5,850,218, the entire disclosure of which is incorporated by reference herein.

Such cable Internet systems as described above suffer from shortcomings because the enhanced STBs required by such systems for customers to view Internet content on their televisions are costly to design, manufacture, implement, and maintain. As new STBs are designed and put into use, cable providers must maintain a field service staff dedicated to deploying the new STBs in the thousands/millions of homes served by that cable provider. As new functionality is added to those STBs, a similarly burdensome retrofit program would need to be deployed. Likewise, maintenance issues with enhanced Internet-enabled STBs creates staffing, cost, and customer service-related problems for cable providers.

As such, a need is felt in the art for improvements to cable systems wherein greater integration is provided between the functionality provided by VoD systems and the functionality provided by Internet services and wherein a greater degree of freedom over content choices is provided to customers. Furthermore, it is believed that there is a large percentage of the population who do not have broadband Internet access (or even computers) but do have cable television service that provides VoD service through a STB.

In view of the foregoing, the inventors herein believe that a need exists in the art for a cable system capable of providing Internet-based content, particularly personalized customer-specific Internet-based content, to cable television customers for display on their televisions independently of whether those customers subscribe to an Internet service and independently of whether those customers' STBs are Internet-enabled.

In an effort to fill these needs in the art, the inventors herein disclose a system and a method for delivering personalized content to customers of a subscription television service for display on their televisions, this system and method (a) converts Internet-based content from an Internet based format to a format suitable for display on a customer's television through a customer's set top box, and (b) after the conversion, delivers the converted content to a set top box associated with that customer for display on that customer's television. With the present invention, the customer's set top box need not be Internet-enabled.

Preferably, the subscription television service is a cable television service and the conversion is performed by a conversion and playback system located with a cable-head end. The content is preferably multimedia content such as video. Furthermore, the delivering step preferably comprises delivering the content to that customer's set top box in response to processing of a request from the customer submitted through a cable provider's video-on-demand system.

The present invention also preferably further comprises retrieving the Internet-based content from an Internet-based storage system having a messaging address associated with the customer, the retrieved content having an Internet-based data format. The Internet-content can be periodically pushed or pulled from the customer's messaging address within the storage system to a cable company's head end.

The present invention may further (a) associate the customer messaging address with an identifier for the customer's set top box, (b) determine the identifier for the customer's set top box at least partially from the request, and (c) responsive to the content request, select content retrieved from the customer messaging address that is associated with the determined identifier for display on the customer's television through the customer's set top box.

These and other features and advantages of the present invention will be in part apparent and in part pointed out in the following description and referenced figures

DETAILED DESCRIPTION OF THE PREFERRED EMBODIMENT

Figure 1:
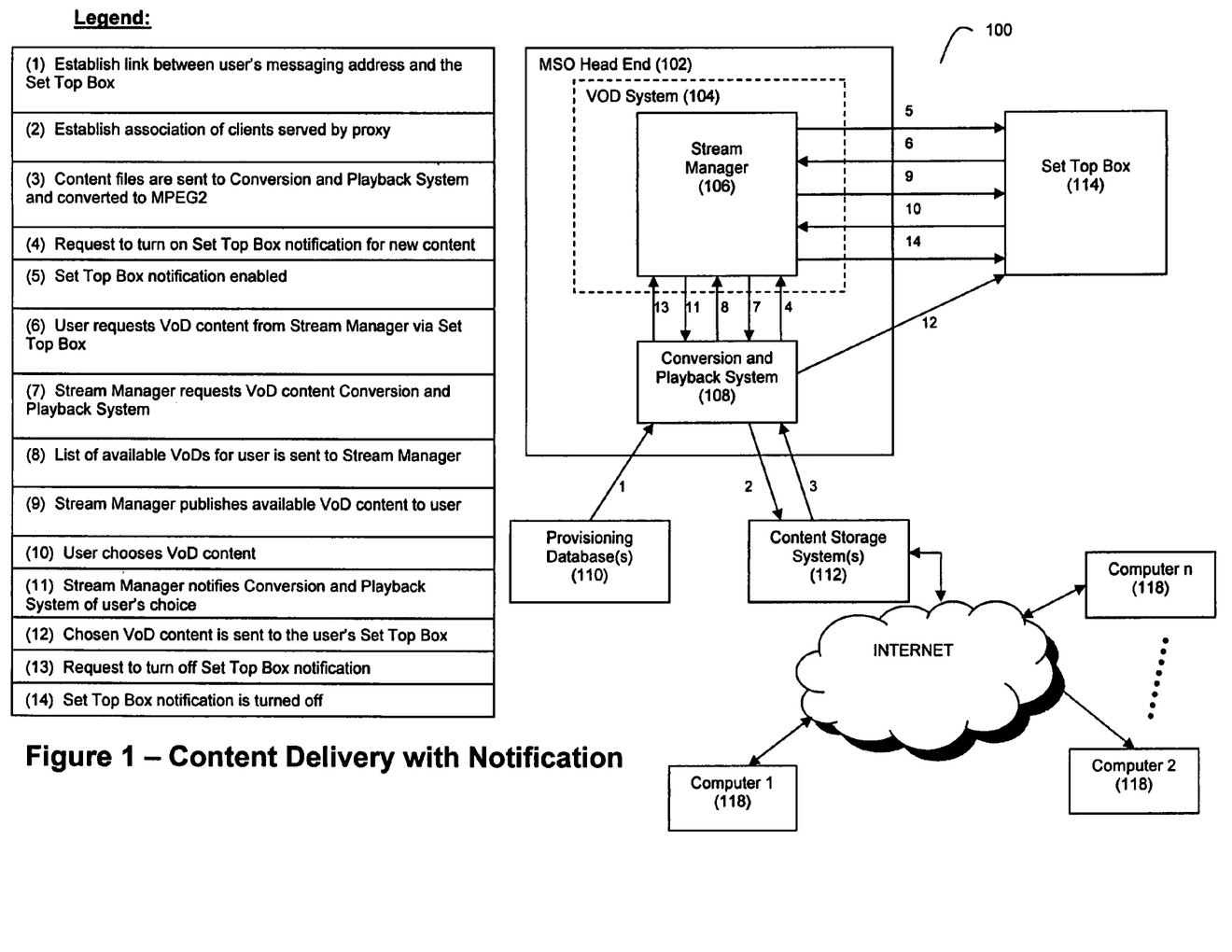
FIG. 1 illustrates a first preferred embodiment together with a system flow including notification.

In a preferred embodiment, the present invention provides the ability of a cable television service subscribers/customers to be notified, browse and view Internet-based content that is sent to one of their messaging (e.g., email) addresses using their television and set top box (STB). These messages can be sent to a customer's messaging address using public or private networks as is known in the art. For example, as shown in FIG. 1, a user of an Internet-connected computer 118 can send, via the Internet, content such as video mail to a particular messaging address on content storage system 112. Using the invention described herein, a cable customer who has access to that messaging address can view the sent content on his/her television through his/her STB whether or not that STB is Internet-enabled. Thus, using the present invention, people can send Internet-based video mail to friends and relatives for display on their televisions in a user-friendly manner.

All interaction by the customer for viewing the content contained in a message is preferably performed using the customer's television and STB. As such, the present invention does not require a fully interactive television system. The interactive nature of this invention is preferably limited to:

1. Optional notification informing the customer of new or unviewed content
2. Customer browsing of a VoD menu system
3. Customer selection via the VoD menu system of content for viewing.

Preferably, the customer uses his/her STB to access his/her content. An optional notification indicator is preferably available on the STB or through a menu displayed on the customer's TV by the VoD system to asynchronously notify the customer that new content is available for viewing. The customer can then access the cable provider's VoD service and then choose a submenu (e.g., a "My content" menu option). This submenu will preferably display a list of customer-specific content. From this submenu, the customer chooses one of the listed content files for viewing. The content is then played using the existing VoD interface (i.e., the customer can pause, rewind, fast forward, ... through the content) provided by the cable company's VoD system.

This system preferably restricts what content is shown to customers based on the information stored in a database that associates cable customers with their messaging addresses in some manner (preferably associating each cable customer's STB ID with that customer's messaging address).

With reference to FIGS. 1-4, in the preferred embodiment, there are five major components to this system 100.

1. Cable Operator Provisioning Database (PDB) 110;
2. Video on Demand (VoD) system 104, which includes an interface for communicating with an external content source;
3. Content Storage System (CSS) 112;
4. Content Conversion and Playback System (CPS) 108; and
5. Set Top Box (STB) 114

PDB 110:

The purpose of the PDB 110 is to create associations between the unique identifier used by each cable customer's STB and one or more of that customer's messaging addresses/aliases. These associations provide system 100 with the capability to filter content on a customer-specific basis, thereby providing personalized content on demand to the customer. Preferably, only content sent to a cable customer's messaging address is visible to that customer.

Figure 5:
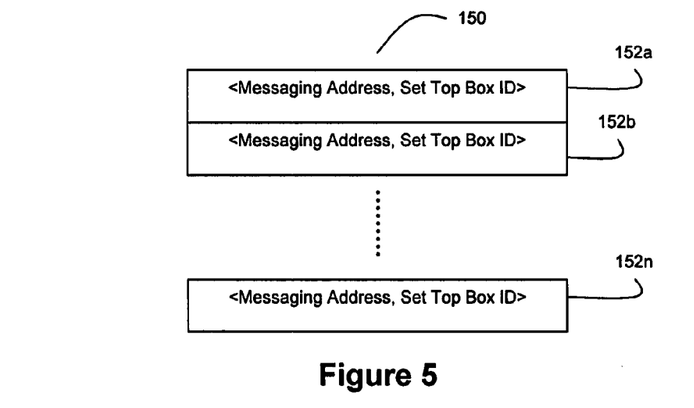
FIG. 5 illustrates an example of a preferred association table for the provisioning database(s)
Figure 6:
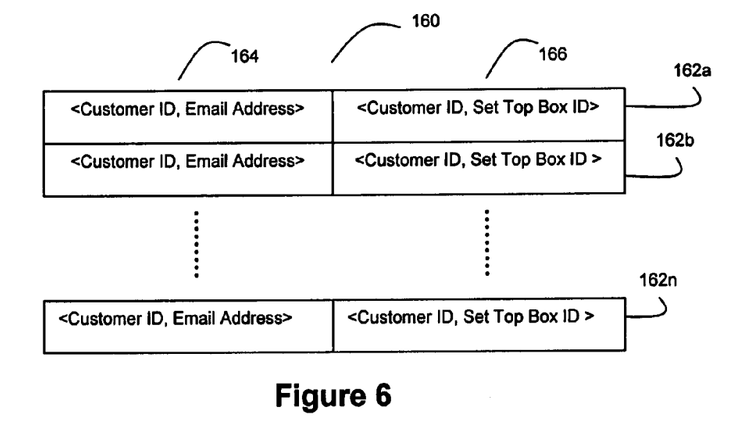
FIG. 6 illustrates another examples of a preferred association table for the provisioning database(s)

PDB 110 preferably comprises one or more databases maintained by the cable company. FIGS. 5 and 6, which are described in greater detail below, depict exemplary data tables that associate customer STBs with customer messaging addresses. PDB 110 is preferably accessible to cable head ends 102 via a secure network connection using readily known communication technology.

CSS 112:

The CSS 112 provides CPS 108 with access to the content available for the customer. It is worth noting that CSS 112 encompasses one or more CSSs 112 because each CPS 108 may be in communication with multiple CSSs 112. CSS 112 is preferably a video mail service or the like, although this need not be the case.

Figure 9:
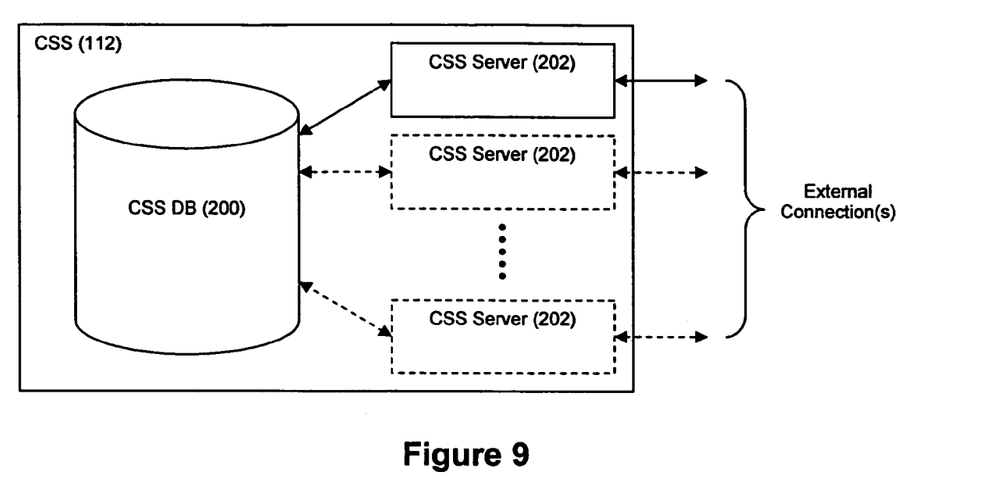
FIG. 9 illustrates a block diagram overview of a preferred content storage system.

FIG. 9 depicts a block diagram overview of a preferred CSS 112, which preferably comprises one or more CSS servers 202 in communication with CSS database 200. Database 200 can store, by messaging address, content to be made available to the customers via VoD system 104. Each server 202 preferably operates to control access to the CSS database 200 for external connections such as connections to a CPS 108 and the Internet. To connect with a CPS, it is preferred that an interface be installed on the CSS servers 202 in accordance with the teachings set forth below for steps 2 and 3 described below in connection with the system flow for the preferred embodiment of the present invention. Following the teachings of the present invention, the creation of such an interface is well within the abilities of a person having ordinary skill in the art. If no such interface is present on the CSS, it is preferred that the CPS be configured to replicate the customer associated with the messaging address of interest on the CSS. By emulating that customer (preferably using the customer's ID and password necessary to gain access to the content stored on the CSS), the CPS will be able to retrieve the customer's content using existing CSS interfaces.

CSS 112 can include multiple servers 202 in communication with database 200 for scalability and load handling. Furthermore, it is worth noting that CSS 112 can be one physical device with multiple server processes running thereon or can be multiple physical devices in communication with each other. A preferred amount of storage for the CSS 112 would be 100 Gigabytes. However, it should be understood that more or less storage can readily be used in the practice of the present invention. A suitable platform for the CSS 112 that can be used by a practitioner of the present invention is the Vibe Video Mail service that is part of the Vibe video communications platform provided by Vibe Solutions Group, Inc. of Clayton, Mo.

The content stored by CSS 112 is preferably Internet-based multimedia content such as video. These content files can be stored by CSS 112 in a variety of formats including, but not limited to, Windows media formatted video (WMV), Apple QuickTime, MPEG2, etc. However, it is worth noting that content other than video can be used, including but not limited to photos (or other graphical content), audio, web pages, etc.

VoD System 104:

The VoD system 104 is the cable company's VoD hardware and software located at the cable company (e.g., multiple system operator (MSO)) head end 102. In the preferred embodiment, the VoD system 104 includes, as a component thereof, a stream manager 106. The stream manager 106 comprises one or more pieces of hardware and software configured to, among other things, send menus to STB 114, command video streamers to stream content to STB 114, and provide pause, rewind and other controls to the STB 114 through which a customer can control the a video stream that he/she is viewing.

Stream manager 106 also preferably includes an interface that allows the CPS 108 to interact with STB 114. This interface is preferably configured to pass an STB identifier, content lists, and related commands between the VoD system 104 and the CPS 108. The creation of software that interfaces the various VoD system data formats of different cable companies with a CPS 108 as described herein is well within the routine abilities of a person having ordinary skill in the art. The installation of this interface on the VoD system 104 allows existing (or legacy) STBs 114 to be used to access content in accordance with the teachings of the present invention, thereby providing substantial cost savings for the cable company and customer alike because new STBs or retrofitted STBs will not be needed. Essentially, the present invention is designed to provide personalized Internet-based content to customers independently of whether the customer's STB is Internet-enabled.

CPS 108:

CPS 108 preferably provides four functions. First, it ingests content from CSS 112. Second, it transcodes the content to a format used by the VoD system 104. Third, it sends and receives commands to/from the VoD system 104. Fourth, it plays content upon command from the VoD system 104 (by way of command from the customer to the STB 114) for viewing on the customer's TV.

Figure 10:
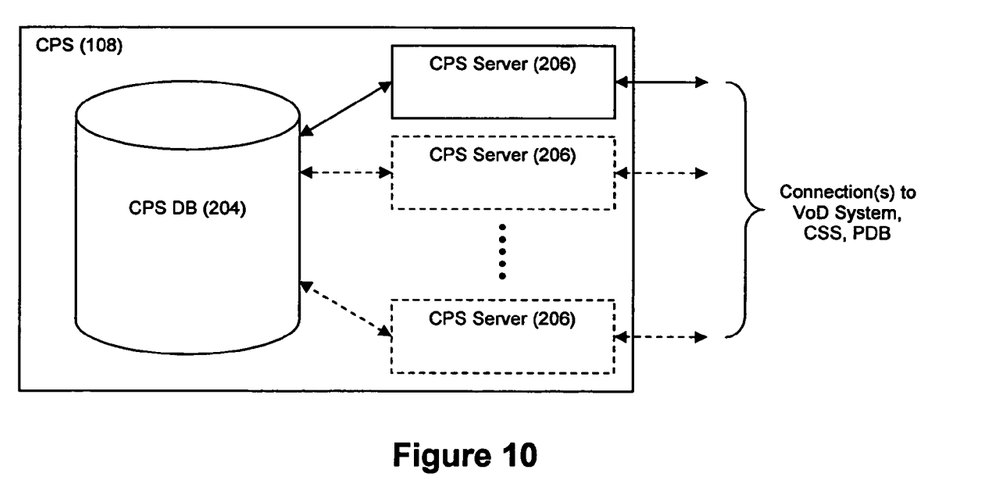
FIG. 10 illustrates a block diagram overview of a preferred conversion and playback system.

CPS 108 is preferably implemented in software, hardware, or some combination thereof located within cable head end 102. If the head end 102 has appropriate hardware already available thereon, the CPS 108 can be a software add-on to the legacy head end 102. Otherwise, it is believed that the CPS server 108 will be implemented as a hardware and software add on to the head end 102. FIG. 10 depicts a block diagram overview of a preferred CPS 108. CPS 108 preferably comprises one or more CPS servers 206 in communication with CPS database 204. Database 204 can serve to store customer content from the CSS 112 that is available for playback by the customer. Preferably, this stored content is content that has been converted to a format suitable for playback through the customer's STB 114. Each server 206 preferably operates to control access to the content stored in database 204 and further operates to provide the four functions set forth above. Each server 206 is preferably in communication with VoD system 104 via the VoD system interface, with PDB 110 to learn the pertinent associations between customer messaging addresses, and with CSS 112 to selectively ingest content for conversion and playback.

As with CSS 112, CPS 108 can include multiple servers 206 for scalability and load handling. Likewise, CPS 108 can be one physical device with multiple server processes running thereon or can be multiple physical devices in communication with each other. A preferred platform for CPS 108 is a general purposed computer executing Linux on a high speed Intel processor together with an optional dedicated hardware accelerator for performing conversions from Internet formats to STB suitable formats (e.g., an MPEG2 subset). A preferred amount of storage for the CPS 108 would be 100 Gigabytes. However, it should be understood that more or less storage can readily be used in the practice of the present invention.

Creation of CPS 108 is well within the abilities of a person having ordinary skill in the art following the teachings present herein.

STB 114:

STB 114 is preferably the standard STB provided by the cable company to its customers. The STB 114 provides an interface to control and view the content delivered by this invention, which is preferably the existing VoD playback interface. There is preferably no requirement to install additional software on the STB 114 to implement the preferred embodiment of the present invention. Furthermore, there will be no need for the STB to be Internet-enabled for the present invention to operate.

System Flow:

With reference to FIG. 1, a system flow for a first preferred embodiment of the invention will now be described.

Step 1: Establish Link Between Messaging Address and STB

Two methods can be used to associate customer messaging addresses with customer STB identifiers. Preferably, each STB 114 provided by the cable company has an associated STB ID that uniquely identifies that STB. The first association method, which can be referred to as "static provisioning", uses provisioning of the association based on a database maintained by the cable television operator. The second association method, which can be referred to as "dynamic provisioning", uses provisioning where the customer creates the association between his/her messaging address and his/her STB identifier via the STB and a web browser running on an Internet-connected computer.

Data Description

FIG. 5 depicts an exemplary association table 150 for associating messaging addresses with STB identifiers. Preferably, each cable operator will maintain the PDB 110 such that PDB 110 stores a master association table 150 as shown in FIG. 5 or a master association table 160 as shown in FIG. 6 that associates the STB ID(s) and messaging address(es) for each customer using the present invention. Furthermore, CPS 108 also preferably stores an association table that is preferably a subset of rows from either table 150 or table 160, wherein the subset includes rows for customers served by the head end 102 within which that CPS 108 resides. This allows the CPS 108 the option of limiting the number content items that it converts and stores to only those content items designated for customers served by that particular VoD system 104. The association table stored by each CPS is preferably formatted like table 150 rather than table 160.

Association table 150 comprises a list of unique rows 152a, 152b, ... 152n, each row preferably having two columns. The first column preferably identifies a messaging address for a customer and the second column preferably identifies a STB identifier for that customer's STB.

The format for the master association table 160 shown in FIG. 6 includes a column 164 that associates a customer ID with a messaging address and a column 166 that associates a customer ID with a STB ID. Each row 162a, 162b, ... 162n then comprises the messaging address and STB ID shared by the same customer ID. The table 160 of FIG. 6 is believed to be useful for cable operators whose business model segments Internet customers and cable customers into different databases.

It is worth noting that the association table 150 or 160 may associate multiple messaging addresses with one STB identifier (where a customer has a plurality of messaging addresses to which he/she wishes to have access via the present invention). Likewise, the association table 150 may associate multiple STB identifiers with one messaging address. In such cases, because some customers may want the ability to view content on different televisions, it is possible that the same messaging address may appear in table 150 or 160 on different CPSs (e.g., when a customer's "work" STB is served by a different head end than that customer's "home" STB).

Static Provisioning

The cable operator may choose to implement either an automated or a manual static provisioning process. In the case of a manual process, the cable operator will preferably provide an administrative interface on the CPS 108 for cable company employees (or data entry contractors) to enter each messaging address and STB identifier.

However, due to the data entry inefficiencies inherent in this manual process, an automated process may be preferred. With an automated process, an automated provisioning interface will preferably send a file to the CPS 108 with table 150. As previously described, this file will preferably be a subset of entries from the master table 150 or 160 in PDB 110 comprising the customers that are provisioned on the cable plant used by the VoD system 104.

The file format used to transfer the provisioning information may be customized for the cable operator. A preferred format for the cable operator is a list of comma-separated values where one row of values is on one line of the file. The row preferably contains the messaging address and STB identifier. An acceptable alternative format that may be easier for cable operators using a table 160 like that of FIG. 6 is to send two files that have a common identifier, such as a unique customer ID. The CPS 108 can then consolidate the entries in this file to a format like that shown in table 150 of FIG. 5.

The file sent to CPS 108 is preferably regenerated from the cable operator's PDB 110 at least once each day and then transferred to each CPS 108 of each head end 102 using a secure file transfer protocol such as SFTP. The time between file transfers can be customized for each cable operator.

After the file is received by the CPS 108, it is preferably moved to a working directory within CPS 108. Once the file is in the working directory, a process running on CPS 108 can execute to replace the CPS's existing association table 150 with the new file of associations. The new association information is stored in by the CPS 108 (for example, in a MySQL database) for access when requests are received to display content.

Dynamic Provisioning

Two variations for dynamic provisioning are described herein. The first variation is believed to be a simpler process wherein the customer enters all data for the association of an STB identifier and messaging address. The second variation requires the customer to relay a unique string created by the CPS 108 to associate the customer's STB with his/her messaging address.

Under the first variation of dynamic provisioning, the customer can use a web browser running on his/her computer to access a web page available on CSS 112 or on another server that is authorized to communicate with CPS 108. The customer then preferably enters three data elements on this web page: 1) his/her cable provider (which is preferably selected from a list displayed on the web page), 2) his/her messaging address (e.g., email address) and 3) the STB ID for his/her STB.

Once this step has been completed, an activation video is preferably sent to the customer's STB. This activation video preferably contains a unique code. Upon reviewing this activation video on his/her TV, the customer learns this unique code and then uses the web browser to submit the code to the CSS 112. Once this code is confirmed, personalized content can be delivered to the customer's STB.

The second variation of dynamic provisioning does not require the customer to determine the STB ID for his/her STB.

The steps of this second dynamic provisioning variation are as follows:
1. The customer accesses a "My Content" submenu of his/her VoD menu system.
2. A video message with a unique activation code is created and listed in the customer's submenu if this is the first time this STB ID has been sent to the CPS 108 from stream manager 106. It is also possible for this video message to always be available on the submenu, to thereby allow the customer to reconfigure their message ID associations as needed over time.
3. The customer plays the video message and obtains the single use activation code. This code is preferably configured to identify the cable operator and the customer's STB.
4. The customer uses a web browser on his/her computer to access a web page on the CSS 112 and enters the activation/identification code. Responsive to authenticating the customer-entered code, a web page is displayed that allows the customer to add, delete or modify message addresses they wish to be associated with the STB that was used to play the video message.
5. When a new messaging address is placed on the list, an activation message is sent to that address. This activation message contains a link to a web site that must be accessed before the messaging address is added to the association table 150 within CPS 108. After successful activation, the new association entry is sent to the CPS(s) 108 used by the customer.

Step 2: Establish Association of Clients Served by CPS:

Each CPS 108 is preferably assigned a unique token when installed. This unique token contains a device identifier and a cable operator identifier.

Further, each CPS 108 preferably knows the IP DNS name of each CSS 112 that it uses to obtain content for its associated customers. An identification token for each CSS 112 is also preferably stored on each CPS 108 to allow the CPS 108 to authenticate each CSS 112 with which it communicates.

Each CSS 112 preferably stores a list of CPS tokens to use for authenticating each CPS 108 with which it communicates. A directory such as a conventional public IP DNS can be used to map each CSS name to a network address. A similar directory can also be used to map each CPS name to a network address.

Mutual authentication is performed when a connection is opened between a CSS 112 and a CPS 108. Mutual authentication is preferably achieved through a token exchange in accordance with conventional encrypted public key technology.

After successful mutual authentication, the CPS 108 preferably informs the CSS 112 of the type of data exchange (push or pull as described hereinafter) configured for that CPS. In addition, after mutual authentication, the CPS 108 may send to the CSS a list of message addresses that are associated with that CPS. This list of message addresses is sent when the CSS pushes new content to the CPS.

Step 3: Transfer and Conversion of Content:

Content Transfer

There are preferably two types of content exchanges between the CSS and the CPS.
1. A CPS pull (preferably at regularly recurring intervals (such as every X minutes, wherein X is preferably freely configurable by the cable provider)); or
2. A CSS push (preferably at regular recurring intervals as set forth in connection with the CPS server pull discussed above).

As noted, the CPS pull of content preferably occurs every X units of time, wherein X is configurable for each CPS 108 but is also preferably uniform for each cable provider (although this need not be the case). The cable operator preferably sets X based at least in part upon a desired amount of delay that a customer should have to experience between when content arrives at the CSS and when it is available for viewing through the VoD system. A suitable value for X can be 30 minutes, although other values can be readily used in the practice of the present invention.

When it is time to perform a pull, the CPS 108 initiates a connection to each CSS 112 which stores content for customers served by that CPS. Once the connection is established between the CPS and a CSS and both servers authenticated, the CPS sends that CSS the list of message addresses contained in the association table 150 of that CPS. Responsive thereto, the CSS then sends the CPS a list of "new" content for the messaging addresses on that list (new content being content that has not been previously copied to the CPS). Preferably included with this list is a date and time that each item of new content expires. This expiration data is preferably set by CSS as specified by a cable provider. A suitable example of an expiration date/time would be 30 to 60 days after content delivery to the CPS. As explained below, a maintenance process can use this expiration data for storage control.

Figure 8:
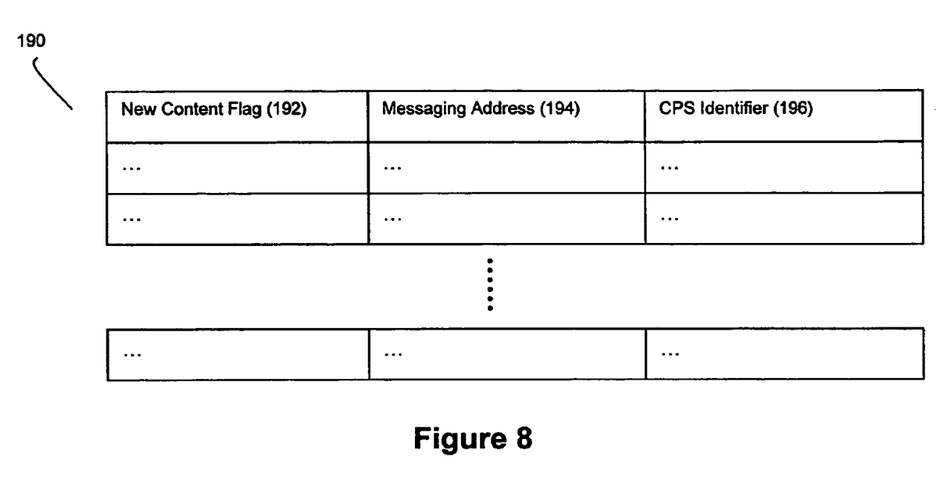
FIG. 8 illustrates an example of a preferred table for associating conversion and playback systems with messaging addresses having new content.

This list can be generated by the CSS using a table 190 such as that shown in FIG. 8 which is preferably stored by the CSS to identify the appropriate CPS for each messaging address and whether new content is stored at each messaging address. Table 190 preferably includes a column 192 for identifying whether there is new content stored for the corresponding messaging address in column 194. Table 190 preferably further includes a column 196 for identifying the appropriate CPS for the corresponding messaging address in column 194.

The CPS then iterates through the new content list. First, the new content is transferred to the CPS from the CSS, and then a message is sent to that CSS to mark the new content as copied to that CPS. After the new content is copied to the CPS, the CPS preferably renames that content using a conventional atomic renaming operation where the new name is stored in a temporary storage directory used by the conversion process described below.

The second type of content exchange is the CSS push, which as noted, preferably occurs every X units of time when there is new content to push. The cable operator preferably sets X based at least in part upon a desired amount of delay that a customer should have to experience between when content arrives at the CSS and when it is available for viewing through the VoD system. A suitable value for X can be 30 minutes, although other values can be readily used in the practice of the present invention.

When it is time to perform a push, the CSS 112 initiates a connection to the CPS 108. CSS can determine the appropriate CPS(s) with which to connect from table 190 of FIG. 8 on the basis of which entries in the table have the new content flag of column 192 set.

Once the connection is established between the CSS and a CPS and both servers authenticated, the CPS then sends the CSS the list of messaging addresses contained in the association table 150 of that CPS. Responsive thereto, the CSS then sends the CPS a list of new content for the messaging addresses on the list.

The CPS then iterates through this new content list. First, the new content is transferred to the CPS from the CSS, and then a message is sent to the CSS to mark the new content as copied to that CPS. After the new content is copied to the CPS, the CPS preferably renames that content as described in connection with the pull operation.

With either a pull or push, if no new content has been received for a particular CPS in some predetermined duration of time (for example, 24 hours), then a connection between the CPS and the CSS is preferably initiated to confirm that there are no connection problems between the two systems.

Content Conversion

A default encoding profile is preferably configured on each CPS 108. This profile contains the parameters that control an encoding process for converting the Internet-based content received from the CSS to a format suitable for display on the customer's TV through the customer's STB 114. A preferred encoding process is an MPEG encoding process, particularly an MPEG2 encoding process for a subset of MPEG2 supported by the STB of interest, as is well known in the art. However, other encoding processes (e.g., encoding processes for MPEGs other than MPEG2) can be used depending upon the formatting used by the cable provider's vendor of STBs.

When each content file is received by the CPS, that content file is placed into a temporary'storage location by the content transfer process described above. The content conversion process then scans this temporary storage location for files to convert. This scan preferably occurs at predetermined intervals of time (such as once a minute).

If a file such as a video content file is present, the conversion process decodes the video from its current format (e.g., WMV, etc.) using appropriate decompression algorithms as determined by the conversion software using readily known techniques. After the file is decompressed into uncompressed audio and video, it is recompressed using MPEG2 (or a variation thereof that is supported by the STB). If formats other than MPEG2 are supported by the STB, then those formats can be used at the option of the cable television operator.

Figure 7:
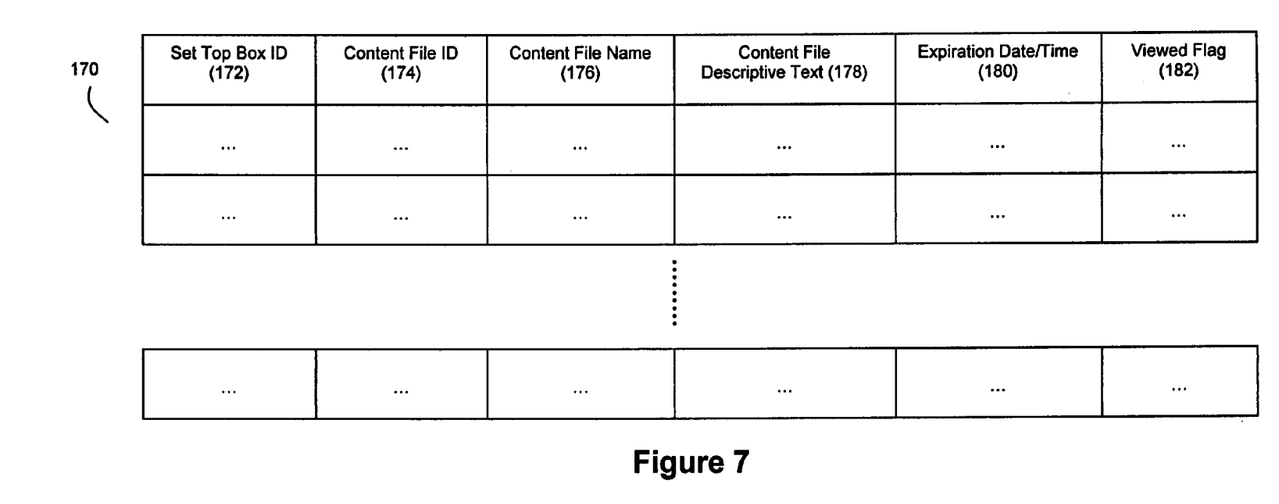
FIG. 7 illustrates an example of a preferred table of content files stored in the conversion and playback system.

Once the content is recompressed, the file is then preferably stored in database 204 of the CPS. Thereafter, a CPS server table such as table 170 shown in FIG. 7 is updated to list that content item as available for a particular STB ID and a content notification flag is set to indicate that the content item has not been viewed. This conversion process preferably continues until no files remain in the temporary storage location.

Step 4: Request VoD System to Enable Notification:

As shown in FIG. 7, the CPS 108 preferably maintains a table 170 of content files for each STB. The table contains one row for each content file. The preferred columns in the table are: STB ID 172, content file ID 174, content file name 176, content file descriptive text 178, expiration date/time 180, and viewed flag 182. The descriptive text for a content file can be determined by any of a number of techniques such as (1) describing a content file using the file's sender ID, date, and time, (2) describing a content file using a subject line associated with the content file stored by the CSS, or (3) some combination of the two.

At regularly recurring intervals (for example, every 60 minutes, the CPS server 108 scans its database and creates a list of STB IDs that have one or more unviewed content items (as determined by the "viewed flag" 182 for each content item in table 170). The CPS then preferably sends one command for each STB on this list to the VoD system 104 to request that the STB notification indicator be enabled. The information in this message preferably contains <STB id, command=enable notification indicator>.

Step 5: VoD System Enables Notification:

Responsive to the request from the CPS 108, the VoD system 104 sends an appropriate command to STB 114 to turn on a notification indicator (typically a light on the STB, but it can also be a flag or "new message" indicator of a submenu displayed on the customer's TV through the STB).

Step 6: Customer Accesses VoD System:

A cable television customer typically accesses the VoD system 104 by entering a specific channel on their STB (e.g., 999). However, other access methods can readily be used. The VoD system 104 responds by displaying a top level menu of VoD choices. The customer can then navigate to one of the menu choices using navigation keys on their remote control or on the STB. Once the menu choice is selected by the customer (typically by pressing a key labeled with the word "enter", "ok", or the like), a new menu category is provided when video messaging is enabled on the cable television system and the customer selects a category relating the personalized content of the inventive system 100 (a category such as "My Content").

Step 7: VoD System Requests Content for Customer:

Once the customer requests to view his/her personalized content (such as by selection of the "My Content" menu option), the VoD system 104 then preferably sends a request to the CPS 108 to obtain the list of content stored by the CPS for that customer's STB. This request from the VoD system 104 to the CPS 108 preferably identifies the requesting STB and presents a command for the list, such as <STB ID, command=list messages>.

Step 8: List of Content is Provided to VoD System:

When a command to list content is received by the CPS from the VoD system, the CPS scans the database table 170 for STB IDs that match the VoD system's request. Responsive thereto, the following data is preferably returned to the VoD system: <STB ID, number of files=XXX, content file 1 id, content file 1 descriptive text, . . . content file XXX id, content file XXX descriptive text>.

Step 9—VoD System Sends Menu of Content to Customer:

The VoD system then preferably reformats that response from the CPS into a submenu that is displayed to the customer on the customer's TV via STB 114. The content file IDs are preferably maintained by the VoD system, but not displayed to the customer.

Step 10—Customer Chooses Content to Play Using VoD System:

From this submenu, the customer can navigate to the content item(s) they want to play. Upon selection of a content item from the submenu by the customer, the customer's selection is then sent back to the VoD system from the STB.

Step 11—VoD System Notifies CPS to Play Particular Content File:

Responsive to the receipt of the customer's selection, the VoD system preferably then sends the CPS 108 a command to play the selected content file on a specific channel. This command preferably identifies the STB ID for the customer, a command to play the requested content, and an identification of the channel on which to play that content (e.g., <STB ID, command=play message, channel=NN>).

Figure 2:
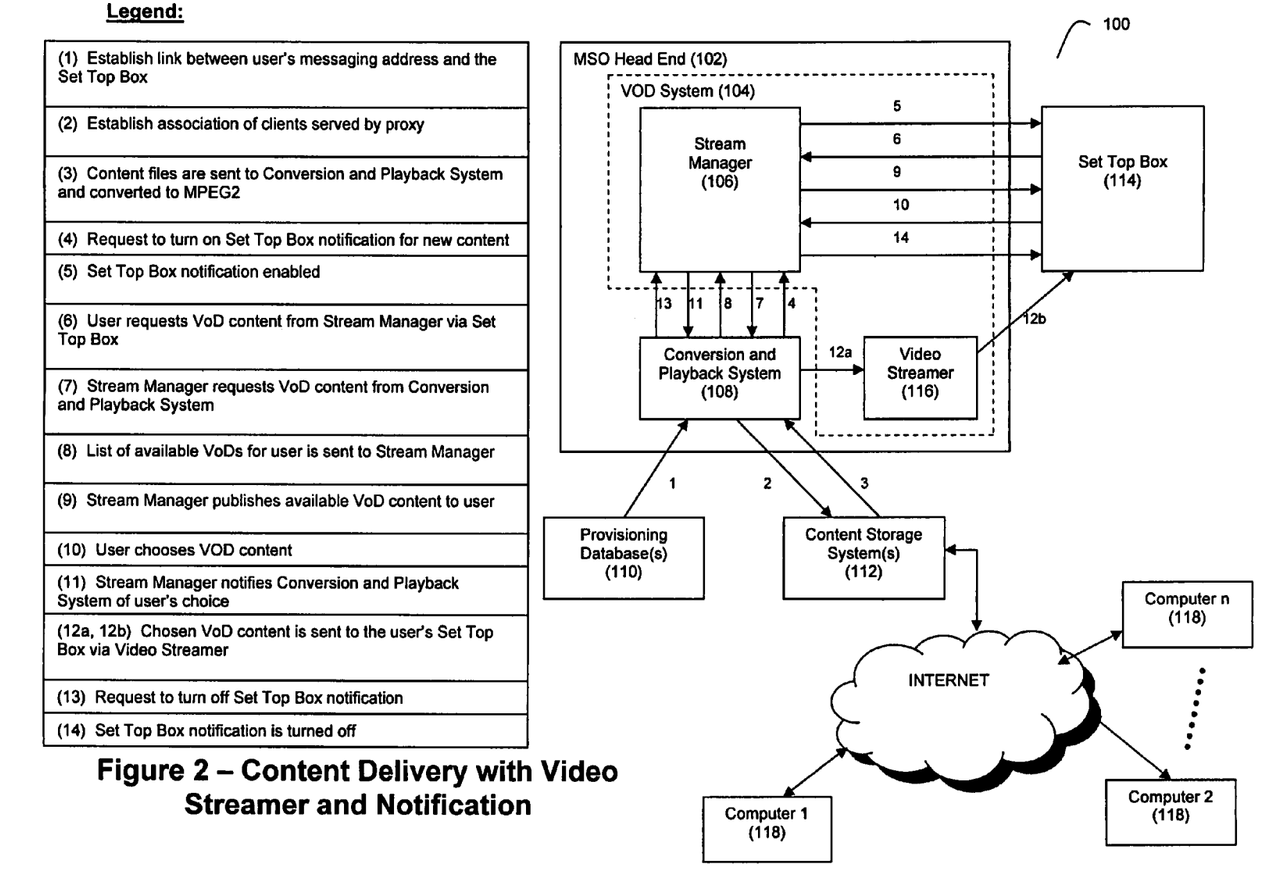
FIG. 2 illustrates a second preferred embodiment using a video streamer together with a system flow including notification.

Step 12—CPS Plays Content File:

The CPS 108 then starts playing the requested content. This can either be done directly from the CPS 108 to the STB 114 (as shown in FIG. 1) or through an intermediate video streaming server 116 (as shown in FIG. 2) provided by the VoD system 104.

Step 13—CPS Requests Notification To Be Turned Off:

After a content file has been played on a customer's TV, the CPS's database is then preferably modified to show that the content file has been played. A notification table stored by CPS that lists a count of unviewed content files for each STB is updated to decrement the count of unviewed content files for that STB. When the count of unviewed files reaches zero for a STB, then a message to disable the STB notification indicator is sent by the CPS to the VoD system. This message preferably identifies the pertinent STB ID and includes a command to disable that STB's notification indicator (e.g., <STB ID, command=disable notification indicator>).

Step 14—VoD System Disables Notification:

Responsive to the command from the CPS to disable a particular STB's notification indicator, the VoD system sends the appropriate command to that STB to turn off the notification indicator.

Figure 3:
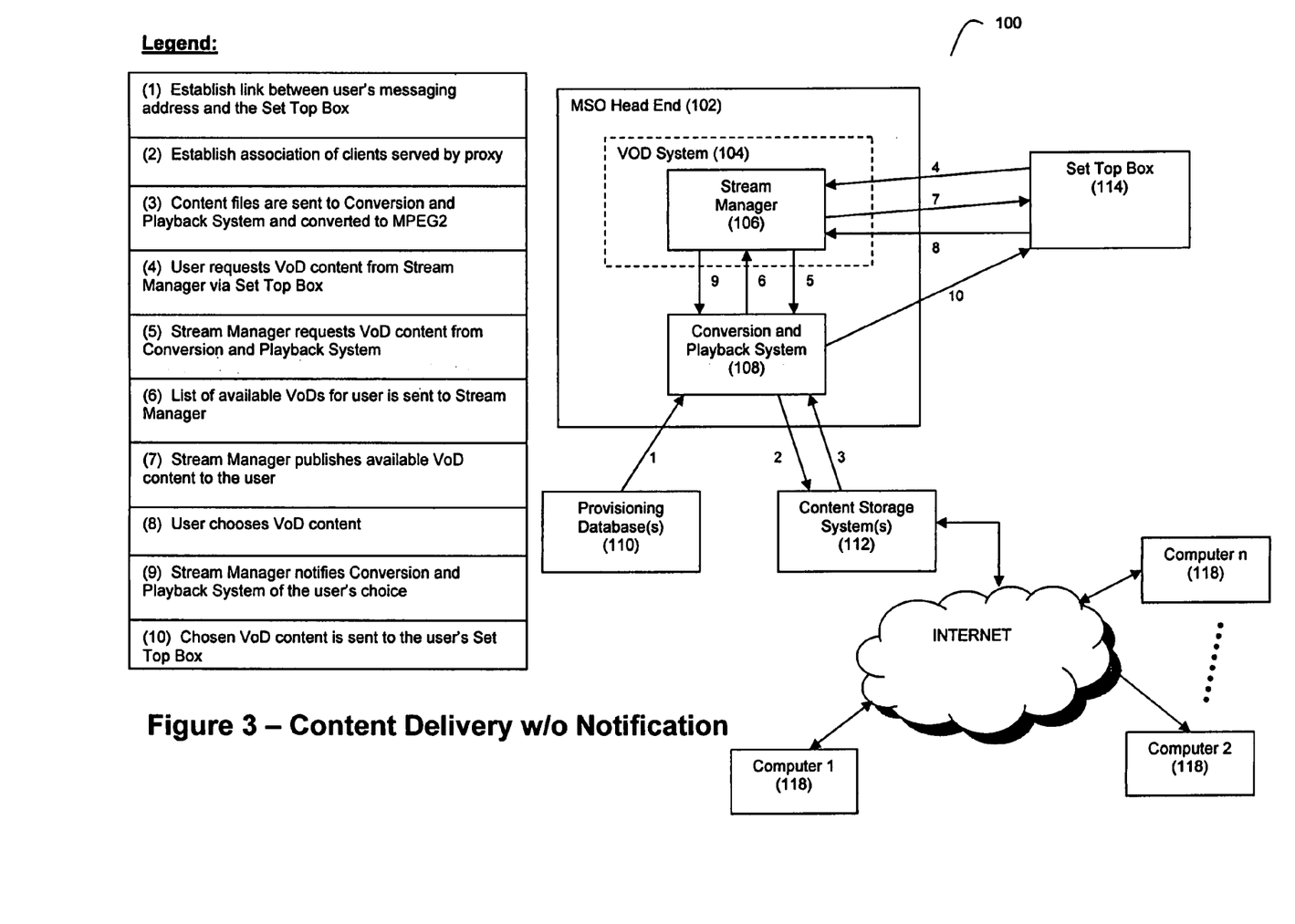
FIG. 3 illustrates a third preferred embodiment together with a system flow not including notification.
Figure 4:
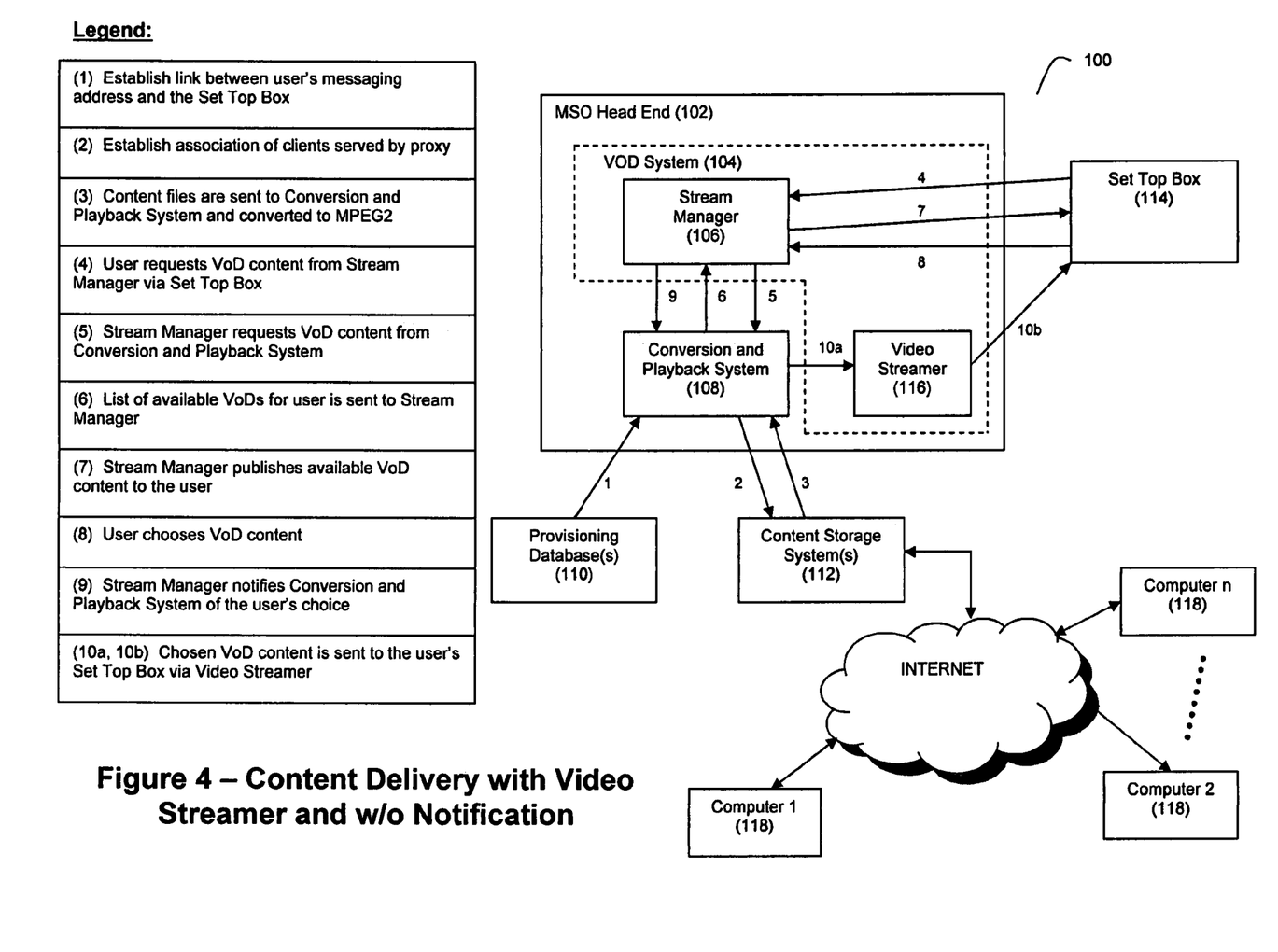
FIG. 4 illustrates a fourth preferred embodiment using a video streamer together with a system flow not including notification.

In addition to the embodiments of FIGS. 1 and 2 wherein a notification indicator is used to inform customers that they have personalized content available for viewing, in other preferred embodiments, such notification need not be present. For example, FIG. 3 depicts an embodiment wherein personalized content is provided to customers without notification. With this embodiment, the steps described for FIG. 1 in connection with notification functions (namely, steps 4, 5, 13, and 14) are omitted. As such, steps 1-10 in FIG. 3 respectively correspond to steps 1-3 and 6-12 described in connection with FIG. 1. FIG. 4 depicts an embodiment wherein no notification indicators are provided and wherein an intermediate video streaming server 116 is used.

Figure 11:
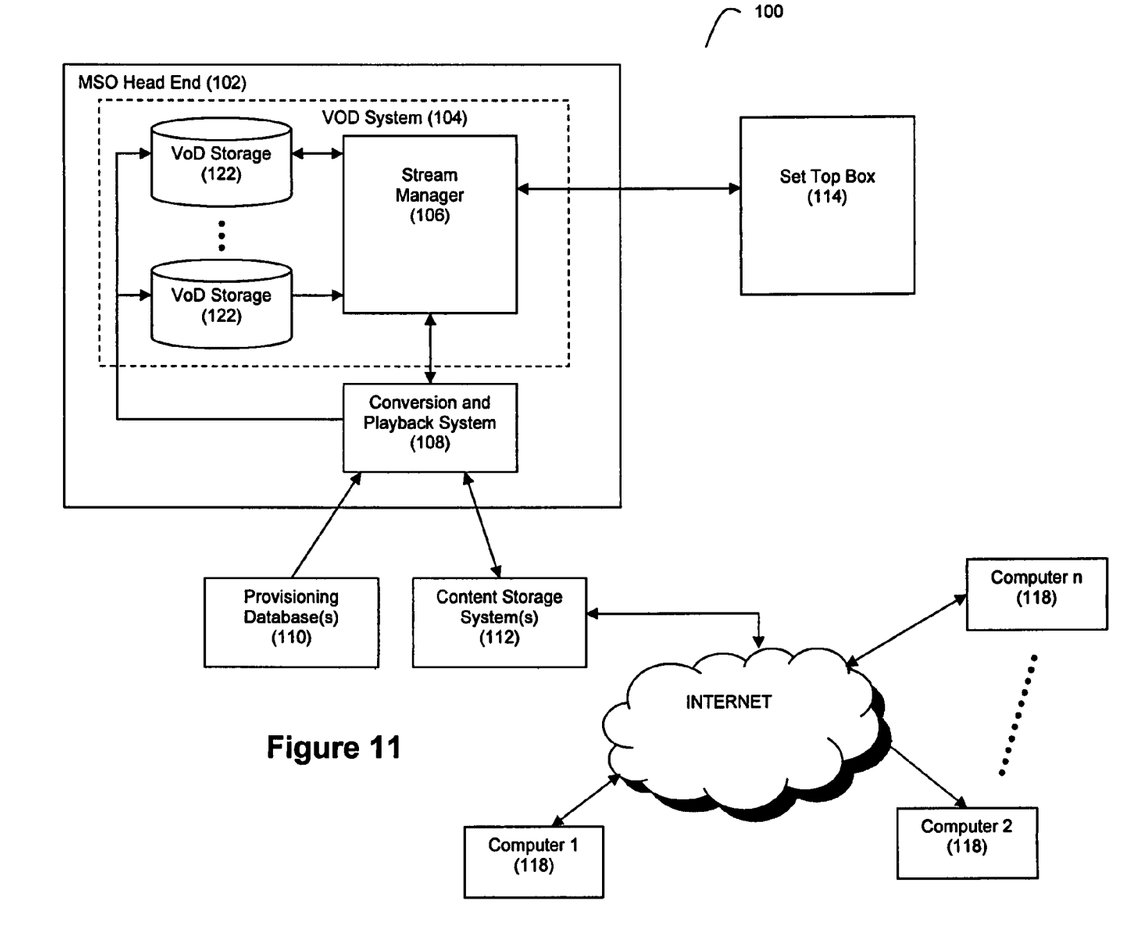
FIG. 11 illustrates another preferred embodiment wherein VoD system storage is used for storing customer content.

FIG. 11 depicts an alternative to any of the embodiments described herein, wherein content storage for the CPS is offloaded to available storage 122 within VoD system 104. In such an embodiment, the CPS 108 can instruct the stream manager 106 of the content files within storage 122 that are to be played on each STB 114. In such cases, the CPS need not interact directly with the STB to effectuate playback. Rather, the STB can interact directly with the stream manager 106 for playback. Communication between the stream manager and CPS will still preferably take place to (1) inform the stream manager 106 of the content files available for playback in storage 122 and (2) inform the CPS when content has been played (to thereby allow the CPS to decrement its table with a count of unviewed content items for a particular STB). As such, in the embodiment of FIG. 11, the "playback" aspect of the CPS 108 can be limited to controlling the playback provided by the VoD system 104 via control communications with the VoD system 104 described above as to what content has been stored in VoD storage 122. Further, it should be noted that in such an embodiment, the CPS 108 need not be located within the cable head end 102.

Figure 12:
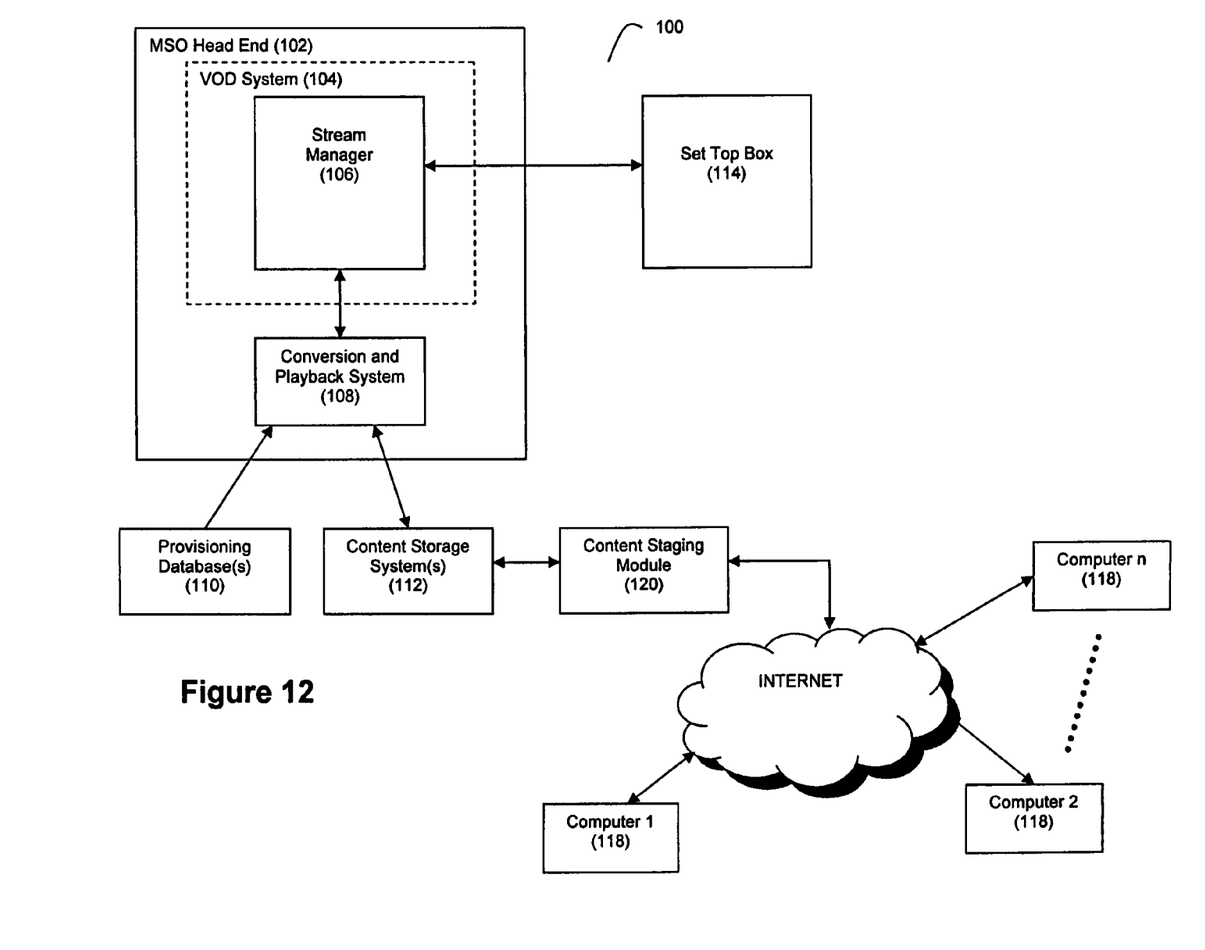
FIG. 12 illustrates another preferred embodiment wherein a content staging module is present.

Furthermore, as shown in FIG. 12, system 100 as described on connection with the embodiments of FIGS. 1-4, can optionally include a content staging module (CSM) 120 in communication with CSS 112 (or optionally CPS 108). By way of CSM 120, a functionality can be provided wherein personalized content for a customer is actively sought out on the Internet by system 100 in response to a customer's identified interests. For example, if a customer has informed that cable provider in some manner of his/her interest (e.g., an interest in a particular major league baseball team), the CPS can be configured to instruct CSM 120 (preferably by way of the CSS) to find video clips or the like available on the Internet related to that interest (e.g., finding video highlights for the latest game played by that major league team that are available on a sports/news website). Upon finding content on the Internet that matches the customer's identified interests, that content can be downloaded to the customer's messaging address in CSS server 112, to thereby make it available for viewing by the customer.

In such embodiments, the customer can inform the cable provider of his/her interests via any of a number of techniques including but not limited to the following examples. In one example, the cable provider can maintain a website with interactive pages through which customers can communicate their interests. As another example, an interactive menu presented on the customer's TV through VoD system 104 can be used by a customer to communicate his/her interests. Customers can even communicate their interests to cable providers via forms filled out by customers and submitted/mailed to their cable providers. Once the cable provider is informed of the customer's interest(s), appropriate software on the CSM 120 can be configured to search the Internet for content of interest and download that content to the customer's messaging address.

Maintenance Processes:

The CPS 108 is also preferably configured to carry out various maintenance processes such as the ones described below.

Content File Clean-Up

A content expiration maintenance process is preferably periodically executed by the CPS (e.g., once a day). However, it should be added that this execution interval is preferably freely configurable by the cable operator. This expiration process would search the database tables 170 of FIG. 7 for expiration times that are older than the current time. If a content file is found in table 170 with an expiration time older than the current time, then that content file is preferably removed from the CPS's database, to thereby remove it from the content file system.

System Monitoring

Also, a variety of operational parameters can be monitored on the CPS to maintain its operation. These parameters include but are not limited to:

Number of running processes

Verification of processes that should always be running.

Disk space utilization

Network utilization

Memory utilization

Thresholds to generate alarms when these operational parameters indicate a problematic condition are preferably used by the system monitoring software to notify the cable provider of problematic conditions. Preferably, these thresholds can be customized for each cable operator. In addition, specific monitoring software can be installed for cable operators to simplify integration into their operational environment.

While the present invention has been described above in relation to its preferred embodiment, various modifications may be made thereto that still fall within the invention's scope, as would be recognized by those of ordinary skill in the art. Such modifications to the invention will be recognizable upon review of the teachings herein. For example, the teachings of the present invention are equally applicable to satellite television systems. While VoD technology for satellite TV at the current time is still in its infancy, as technological progress continues into the future for satellite TV, it is believed that the present invention's applicability to satellite TV will also increase in value. As such, the full scope of the present invention is to be defined solely by the appended claims and their legal equivalents.

What is claimed is:

1. A method of delivering personalized content to customers of a subscription television service for display on their televisions, the method comprising:

obtaining Internet-based content from an Internet-based storage system, the content being associated with a messaging address of a customer and having an Internet-based format, wherein the messaging address comprises an email address for the customer, and wherein the content comprises video mail that has been sent to the customer's email address, associating the obtained content with an identifier for a set top box of a customer based on a pre-existing association between the customer's messaging address and the customer's set top box identifier, converting the obtained Internet-based content from the Internet based format to a format suitable for display on a television through a set top box, and after the conversion, delivering the converted content to the set top box associated with the customer for display on the customer's television.

2. The method of claim 1 wherein the subscription television service is a cable television service, the method further comprising:

responsive to a request for Internet-based content submitted to that customer's set top box, (1) sending the content request from that customer's set top box to a cable provider video-on-demand system, (2) processing the request within said cable provider video-on-demand system; and wherein the delivering step comprises, responsive to the processing by the video-on-demand system, delivering the content to that customer's set top box.

3. The method of claim 1 further comprising:

determining the identifier for the customer's set top box at least partially from the request; and responsive to the content request, selecting content obtained from the customer messaging address that is associated with the determined set top box identifier, the selected content for display on the customer's television through the customer's set top box.

4. The method of claim 3 wherein the request is submitted to the set top box via either a remote control or a user panel on the set top box.

5. The method of claim 3 wherein the obtaining step comprises periodically pulling new content for the customer from the storage system.

6. The method of claim 3 wherein the obtaining step comprises periodically receiving new content for the customer via a push operation from the storage system.

7. A method of delivering personalized content to customers of a subscription television service for display on their televisions, the method comprising:

obtaining Internet-based content from an Internet-based storage system, the content being associated with a messaging address of a customer and having an Internet-based format, wherein the messaging address comprises an email address for the customer, associating the obtained content with an identifier for a set top box of a customer based on a pre-existing association between the customer's messaging address and the customer's set top box identifier, converting the obtained Internet-based content from the Internet based format to a format suitable for display on a television through a set top box, after the conversion, delivering the converted content to the set top box associated with the customer for display on the customer's television, and linking the customer's email address with the customer's set top box identifier in response to input received through an administrative interface to thereby create the pre-existing association.

8. A method of delivering personalized content to customers of a subscription television service for display on their televisions, the method comprising:

obtaining Internet-based content from an Internet-based storage system, the content being associated with a messaging address of a customer and having an Internet-based format, wherein the messaging address comprises an email address for the customer, associating the obtained content with an identifier for a set top box of a customer based on a pre-existing association between the customer's messaging address and the customer's set top box identifier, converting the obtained Internet-based content from the Internet based format to a format suitable for display on a television through a set top box, after the conversion, delivering the converted content to the set top box associated with the customer for display on the customer's television, and creating the pre-existing association in response to electronic input received from the customer.

9. The method of claim 8 wherein the creating step comprises linking the customer's email address with the customer's set top box identifier in response to input received from the customer through a web page solicits the customer's email address.

10. The method of claim 8 wherein the creating step comprises linking the customer's email address with the customer's set top box identifier by (1) maintaining an activation code that is associated with the customer's set top box identifier, (2) providing the activation code to the customer that is accessible via the customer's set top box, (3) receiving input from the customer through a web page, wherein the input comprises the activation code and the customer's email address, and (4) creating the pre-existing association from the received input.

11. The method of claim 2 wherein the storage system is external to a cable head end.

12. The method of claim 1 further comprising providing a notification to the customer that new content is available through the customer's set top box.

13. A method of making personalized content available for viewing by customers of a subscription television service on their televisions, the method comprising:

associating a customer messaging address for a storage system that is configured to store Internet-based content for the customer with an identifier for a set top box subscribed to by that customer, wherein the messaging address comprises an email address for the customer, and wherein the content comprises video mail that has been sent to the customer's email address, obtaining from the storage system the content stored at the customer's messaging address;

converting the obtained content from an Internet-based format to a format suitable for playback on the customer's television through the set top box, wherein the converting step is not performed by the set top box; and storing the converted content such that it is accessible to the customer via a request input from the customer to the set top box.

14. A system for making personalized content available for viewing by cable customers on their televisions, the system comprising:

a storage system configured to store Internet-based content for a customer messaging address, wherein the messaging address comprises an email address for the customer, and wherein the content comprises video mail that has been sent to the customer's email address;

a database configured to store data that associates the customer messaging address with an identifier for a set top box subscribed to by that customer;

a cable head end in communication with the storage system, the database, and a set top box for the customer's television, the cable head end being configured to (1) obtain the content stored at the customer's messaging address, (2) convert the obtained content from an Internet-based format to a format suitable for playback on the customer's television through the set top box, and (3) deliver the converted content to the set top box identified by the set box identifier stored in the database in association with the customer's messaging address.

15. The method of claim 13 wherein the subscription television service is a cable television service, the method further comprising storing the converted content in a storage area of a cable head end.

16. The method of claim 13 further comprising:
receiving a request from the customer to play stored content, the request being submitted as input to the set top box; and
responsive to the received play request, playing the requested content on the customer's television through the customer's set top box.

17. The method of claim 16 wherein the obtaining step comprises periodically receiving new content via a push operation from the customer's messaging address to a cable head end.

18. The method of claim 16 wherein the obtaining step comprises periodically pulling new content from the customer's messaging address to a cable head end.

19. The method of claim 13 wherein the subscription television service is a satellite television service.

20. The system of claim 14 wherein the cable head end is further configured to store the converted content and deliver said stored converted content accessible to the customer in response to a request input from the customer to the set top box.

21. The system of claim 20 wherein the head end comprises:
a conversion and playback system configured to obtain the content and perform the content conversion;
a video-on-demand (VoD) system in communication with the customer's set top box and the conversion and playback system, the VoD system being configured to (1) receive a request from the customer to play stored content, the request being submitted to the VoD system by the customer as input to the set top box, (2) communicate the received play request to the conversion and playback system; and
wherein the conversion and playback system is further configured to, responsive to the communicated play request, cause the requested content to be communicated to the customer's set top box for playback on the customer's television.

22. The system of claim 14 further comprising a content staging module in communication with the storage system and configured to (1) retrieve content from an Internet website that matches an identified customer interest, and (2) provide the retrieved content to the storage system for subsequent conversion and playback on the customer's television.

23. A method of providing a cable customer with access to Internet-based content stored at a messaging address associated with the customer, the method comprising:
interfacing a conversion and playback system with a cable company video-on-demand (VoD) system to which the customer subscribes, the conversion and playback system being configured to (1) communicate with a storage system to obtain Internet-based content stored at the customer's messaging address, wherein the messaging address comprises an email address for the customer, and wherein the content comprises video mail that has been sent to the customer's email address, (2) convert the obtained content from an Internet-based format to a format suitable for playback on the customer's television through a set top box for the customer's television, and (3) interact with the VoD system to effectuate communication of the converted content to the set top box for display on the customer's television, wherein the conversion and playback system is not located within the set top box.

24. A method of delivering Internet-based content to customers of a subscription television service for display on their televisions, the method comprising:
associating an Internet-based messaging address for a customer with a set top box identifier for the customer, wherein the messaging address comprises an email address for the customer, and
delivering Internet-based content that had been sent to the customer's Internet-based messaging address to a set top box associated with that customer for display on that customer's television based on the association between the customer's Internet-based messaging address and the customer's set top box identifier, independently of whether that customer's set top box is Internet-enabled, wherein the content comprises video mail.

* * * * *